A. Carney.
Hose.

N° 76049. Patented Mar. 31, 1868.

WITNESSES

INVENTOR.
Andrew Carney
per Munn & Co
Attorneys

United States Patent Office.

ANDREW CARNEY, OF NEW YORK, N. Y.

*Letters Patent No. 76,049, dated March 31, 1868.*

IMPROVED HOSE.

*The Schedule referred to in these Letters Patent and making part of the same.*

TO ALL WHOM IT MAY CONCERN:

Be it known that I, ANDREW CARNEY, of New York, in the county and State of New York, have invented a new and useful Improvement in Hose for conducting water, &c.; and I do hereby declare that the following is a full, clear, and exact description thereof, which will enable those skilled in the art to make and use the same, reference being had to the accompanying drawings forming part of this specification.

This invention relates to a new and improved method of constructing hose for conducting water forced through the same, whereby the said hose is rendered more strong and durable, and a freer passage is given to water through the same. In the accompanying plate of drawings—

Figure 1:
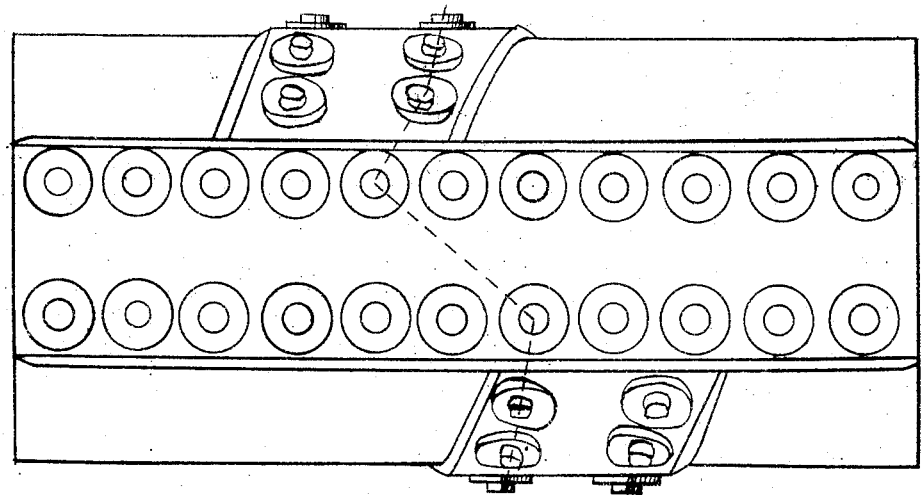
Figure 1 is a plan view of my invention.
Figure 2:
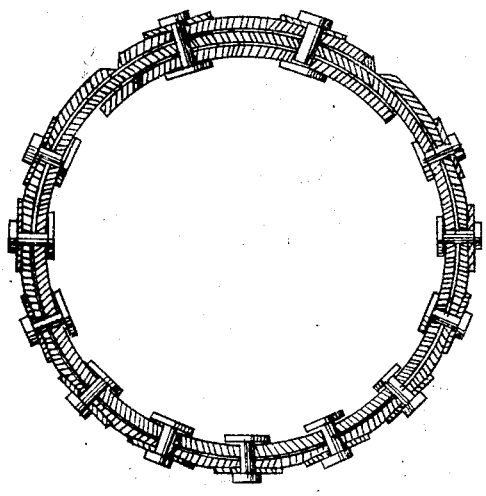
Figure 2 is a cross-section of the same, taken in the line $x\,x$, fig. 1.

The hose is made of leather or other material, having like qualities, and is formed into a continuous shot or length by joining pieces of the same, formed into a tube, in the following manner: The leather or other material is formed into a hollow cylinder or tube of the required diameter, and the edges are butted together instead of being lapped, as is now commonly the case. A strip of the same material is then laid longitudinally over the seam, inside and out, and the parts are then riveted together, as shown in the drawing, with a row of rivets on each side of the seam. Two tubes thus formed are then butted together, and a strip of like material as the tubes is placed over the joint on the outside, and a row of rivets, on each side of the joint, is riveted through both the tube and the strip, whereby a strong and tight joint is made. Tube after tube, in like manner, is added until the hose is of the required length.

The joint between any two tubes is not formed in a plane at right angles to a line running through the centre of the tube, when the tube is straight, as is now commonly the case, but the leather is so cut that the joint is in the line of a screw-thread around the tube, as shown in the drawing, whereby greater strength is gained.

Having thus described my invention, I claim as new, and desire to secure by Letters Patent—

The constructing of hose, for conducting water, formed of leather or other material of sufficient strength and flexibility, joined, substantially as shown and described.

The above specification of my invention signed by me, this 28th day of December, 1867.

ANDREW CARNEY.

Witnesses:
 WM. F. McNAMARA,
 ALEX. F. ROBERTS.